United States Patent
Zhao

(10) Patent No.: US 9,580,589 B2
(45) Date of Patent: Feb. 28, 2017

(54) POLYVINYL CHLORIDE MIXTURE AND PREPARATION METHOD THEREFOR

(71) Applicant: SHANDONG RIKE CHEMICAL CO., LTD., Weifang, Shandong (CN)

(72) Inventor: Dongri Zhao, Shandong (CN)

(73) Assignee: Shandong Rike Chemical Co., Ltd., Shandong (CN)

( * ) Notice: Subject to any disclaimer, the term of this patent is extended or adjusted under 35 U.S.C. 154(b) by 0 days.

(21) Appl. No.: 14/890,125

(22) PCT Filed: Nov. 27, 2013

(86) PCT No.: PCT/CN2013/087966
§ 371 (c)(1),
(2) Date: Nov. 9, 2015

(87) PCT Pub. No.: WO2014/180118
PCT Pub. Date: Nov. 13, 2014

(65) Prior Publication Data
US 2016/0115307 A1    Apr. 28, 2016

(30) Foreign Application Priority Data

May 9, 2013 (CN) .......................... 2013 1 0169266

(51) Int. Cl.
*C08L 27/00* (2006.01)
*C08L 27/06* (2006.01)
*C08F 8/22* (2006.01)
*C08F 255/02* (2006.01)
*C08L 51/06* (2006.01)
*C08L 97/02* (2006.01)

(52) U.S. Cl.
CPC ................ *C08L 27/06* (2013.01); *C08F 8/22* (2013.01); *C08F 255/023* (2013.01); *C08L 51/06* (2013.01); *C08L 97/02* (2013.01); *C08L 2201/08* (2013.01); *C08L 2205/035* (2013.01); *C08L 2205/06* (2013.01)

(58) Field of Classification Search
CPC ... C08L 27/06; C08L 2205/06; C08L 2201/08

USPC .......................................................... 524/527
See application file for complete search history.

(56) References Cited

U.S. PATENT DOCUMENTS

| 3,291,863 | A | * | 12/1966 | Mittelberger ............. | C08F 8/20 |
| | | | | | 525/195 |
| 4,433,105 | A | | 2/1984 | Matsuda et al. | |
| 5,087,673 | A | * | 2/1992 | Watanabe ................. | C08F 8/22 |
| | | | | | 525/334.1 |

FOREIGN PATENT DOCUMENTS

| CN | 100348658 | | 11/2007 |
| CN | 102634138 | A1 | 8/2012 |
| CN | 103224673 | A | 7/2013 |
| GB | 1155033 | A | 6/1969 |

OTHER PUBLICATIONS

International Search Report from Application No. PCT/CN2013/087966 dated Mar. 6, 2014.
International Search Report from Application No. PCT/CN2013/087977 dated Mar. 6, 2014.
Extended European Search Report in EP Application No. 138834160.6 dated Aug. 25, 2016.

* cited by examiner

*Primary Examiner* — Hui Chin
(74) *Attorney, Agent, or Firm* — Calfee, Halter & Griswold LLP

(57) ABSTRACT

The present invention discloses a polyvinyl chloride mixture and a preparation method thereof. The mixture comprises the following components in parts be weight: (a) polyvinyl chloride resin of 100 parts and (b) a toughening modifier of 2-20 parts, the toughening modifier being rubber powder whose elongation at break is 1601%-2200% and which contains the percentage of chlorine of 5-45 wt %. The elongation at break of the polyvinyl chloride mixture of the present inventions is greatly improved, and the defect of low elongation at break of the polyvinyl chloride product is substantially solved accordingly; therefore, the application scope of polyvinyl chloride surely will be greatly widened.

12 Claims, No Drawings

POLYVINYL CHLORIDE MIXTURE AND PREPARATION METHOD THEREFOR

CROSS-REFERENCE TO RELATED APPLICATION

This application is the U.S. national phase entry of PCT/CN2013/087966, with an international filing date of 27 Nov. 2013, which claims the benefit of Chinese Application Serial No. 201310169266.4, with a filing date of 9 May 2013, the entire disclosures of which are fully incorporated herein by reference.

FIELD OF THE INVENTION

The present invention relates to a polyvinyl chloride mixture and preparation method thereof, especially to a polyvinyl chloride mixture with good toughness at low temperature and preparation method thereof.

BACKGROUND OF THE INVENTION

Polyvinyl chloride (PVC) resins generally have the following drawbacks: 1. Poor processability; 2. Poor impact strength at low temperature; 3. Poor heat stability; 4. Poor toughness at low temperature. At present, a variety of methods have been invented to improve the drawbacks of polyvinyl chloride resins, such as: adding additives to improve the processability of polyvinyl chloride resins; adding anti-impact modifiers to improve the anti-impact property of polyvinyl chloride resins at low temperature; adding heat stabilizers to improve the heat stability of polyvinyl chloride resins. However, the problem of the toughness of polyvinyl chloride resins at low temperature has not been well solved so far. And the problem of the toughness of polyvinyl chloride resins has become the major barrier for the development of polyvinyl chloride resins. For example, in the field of materials of the pipes for supplying water, polyvinyl chloride pipe materials have been gradually replaced by polyethylene (PE) pipe materials, mainly because bend deformations of polyvinyl chloride pipe materials buried under ground happen when terrain changes by time. As the toughness of polyvinyl chloride at low temperature is low, polyvinyl pipe materials will be easily broken by a slight bend; however, as the elongation at break for PE is high, PE pipe materials will not be broken even when the PE pipe materials bend because of the change of terrain. Therefore, for long-distance water supplying systems, PE pipe materials are usually preferred. Moreover, the major reason that wood materials cannot be replaced by polyvinyl chloride products is that polyvinyl chloride products will be easily cracked while inserting nails, and the fundamental reason for such phenomenon is the low elongation at break and the poor toughness of polyvinyl chlorides. Besides, cracking of the welding angles of the polyvinyl chloride doors and windows happens easily in winter when temperature is very low, which is also mainly because of the low elongation at break and the poor toughness of polyvinyl chlorides.

For a long period of time, there's a big misunderstanding in the field of modifying polyvinyl chlorides: mistakenly, it is considered that increasing the notch impact strength of polyvinyl chlorides is the same as increasing the toughness of polyvinyl chlorides; and mistakenly, it is considered that increasing the impact strengths of polyvinyl chlorides will increase the toughnesses of polyvinyl chlorides, thus increase the low temperature resistances of polyvinyl chlorides, therefore solve the problem of polyvinyl chloride pip materials such as cracking. Therefore, acrylates anti-impact modifiers (anti-impact ACR), methyl methacrylate-styrene-butadiene copolymers (MBS) anti-impact modifiers are usually used to increase the impact strengths of polyvinyl chlorides. However, although anti-impact ACR and MBS can largely increase the notch impact strengths of polyvinyl chlorides, they can hardly effectively improve the toughnesses of polyvinyl chlorides, especially the toughnesses under low temperature, which is not satisfying. Thus, currently, the elongations at break of polyvinyl chloride resins are not the same as or close to that of polyethylene, and the nail-holding abilities of polyvinyl chlorides are not the same as that of wood material.

SUMMARY OF THE INVENTION

While disregarding the above misunderstanding, the present invention discovered that elongations at break of mixtures of polyvinyl chlorides are closely related to toughnessess at low temperature. The inventor developed rubber powders that are well compatible with polyvinyl chloride resins and with very high elongations at break. To complete the present invention, said powders will be added into polyvinyl chloride resins to further increase the elongations at break of polyvinyl chloride mixtures and improve the toughnesses at low temperature of the polyvinyl chloride mixtures.

One of the objects of the invention is to provide a polyvinyl chloride mixture, from which the polyvinyl chloride products prepared possess good toughness at low temperature.

Another object of the invention is to provide a preparation method of polyvinyl chloride mixtures with simple process applied, and in the method, by adjusting reacting conditions, the elongations at break of rubber powders can be controlled, thus the toughnesses of the polyvinyl chloride mixtures at low temperature can be controlled.

The present invention can achieve the above objects by using the following technical solutions.

The present invention provides a polyvinyl chloride mixture comprising the following components based on parts by weight:
(a) 100 parts polyvinyl chloride resin, and
(b) 2-20 parts toughening modifier;
wherein said toughening modifier is rubber powders with 1601%-2200% elongation at break and 5-45 wt % weight percentage of chlorine;
said elongation at break is tested by GB/T528-2009;
the weight percentage of chlorine is tested by the method A of GB/T7139-2002.

Preferably, based on parts by weight, the polyvinyl chloride mixture according to the present invention further comprises the following components:
(c) 0.5-5 parts stabilizer,
(d) 0-50 parts filler, and
(e) 0-50 parts wood powder, and
(f) 0-10 parts polymers that comprise acrylates, and
(g) 0-10 parts anti-impact modifier, and
(h) 0-5 parts lubricant, and
(i) 0-10 parts pigment.

According to the polyvinyl chloride mixture of the present invention, preferably, said polyvinyl chloride resin is a polyvinyl chloride homopolymer or a polyvinyl chloride copolymer;

wherein, polyvinyl chloride copolymer comprises 80-99.99 wt % vinyl chloride units and 0.01-20 wt % units that are formed by other units;

said other units are selected from one or more of vinyl acetate, propylene, styrene, $C_1$-$C_{12}$ alkyl esters of methacrylic acid, $C_1$-$C_{12}$ alkyl esters of acrylic acid.

According to the polyvinyl chloride mixture of the present invention, preferably, said toughening modifier is selected from the group consisting of the following substances: chlorinated polyethylenes, copolymers of chlorinated polyethylene and (meth)acrylate or the mixtures of chlorinated polyethylene and (meth)acrylate polymer.

According to the polyvinyl chloride mixture of the present invention, preferably, in said toughening modifiers, based on the total weight of the toughening modifier, the weight percentage of alkyl (meth)acrylate is 0-50 wt %.

According to the polyvinyl chloride mixture of the present invention, preferably, said stabilizer is selected from organotin heat stabilizers, calcium-zin stabilizers or lead salt stabilizers;

said filler is selected from calcium carbonate, talc powder or white carbon black;

said polymers that comprise acrylates are selected from copolymers comprising alkyl methacrylates and alkyl acrylates;

said anti-impact modifier is selected from copolymers that is formed by methyl methacrylate, styrene and butadiene;

said lubricant is selected from oxidized polyethylene wax, polyethylene wax, paraffin, stearic acid, glycerol monostearate, pentaerythritol stearate, pentaerythritol adipate or calcium stearate;

said pigment is selected from titanium white, carbon black, ultramarine pigment or fluorescent whitener.

The present invention further provides a preparation method for the above polyvinyl chloride mixtures, said preparation method comprises preparation steps of toughening modifier, which can be specified as follows:

0.01-1.00 parts by weight of dispersing agent, 0.01-1.00 parts by weight of emulsifying agent are added to the reactor, then a dispersing medium is added, the total parts by weight of the dispersing agent, the emulsifying agent and the a dispersing medium are made to 250 parts by weight; then 15-40 parts by weight of high density polyethylene, 0.01-0.5 parts by weight of initiating agent were added, the temperature of the reaction materials are increased to 70-105° C. under the stirring rate of 30-300 rounds/min, and the stirring is maintained between 30-300 rounds/min; then 4-50 parts by weight of chlorine gas are inlet, and the temperature is increased to 135-142° C. while inletting chlorine gas; and the rate of inletting chlorine gas must satisfy that below 60% of the total amount of the chlorine gas is inlet below 135° C., and above 40% of the total amount of the chlorine gas is inlet above 135° C.

The present invention also provides another preparation method for the above polyvinyl chloride mixtures, said preparation method comprises preparation steps of toughening modifier, which can be specified as follows:

(1) Preparation of Chlorinated Polyethylene:

0.01-1.00 parts by weight of dispersing agent, 0.01-1.00 parts by weight of emulsifying agent are added to the reactor, then a dispersing medium is added, the total parts by weight of the dispersing agent, the emulsifying agent and the dispersing medium are made to 250 parts by weight; then 15-40 parts by weight of high density polyethylene, 0.01-0.5 parts by weight of initiating agent were added; the temperature of the reaction materials are increased to 70-105° C. under the stirring rate of 30-300 rounds/min; and the stirring is maintained between 30-300 rounds/min; then 4-50 parts by weight of chlorine gas are inlet, and the temperature is increased to 135-142° C. while inletting chlorine gas; and the rate of inletting chlorine gas must satisfy that below 60% of the total amount of the chlorine gas is inlet below 135° C., and above 40% of the total amount of the chlorine gas is inlet above 135° C.;

(2) Preparation of Chlorinated Polyethylene and (Meth) Acrylate Copolymers:

0.01-1.00 parts by weight of dispersing agent, 0.01-0.50 parts by weight of initiating agent and a dispersing medium are added to the reactor, wherein the total parts by weight of the dispersing agent, the initiating agent and the dispersing medium are 250 parts by weight; then 15-40 parts by weight of the chlorinated polyethylene obtained in step (1), 0.01-0.50 parts of emulsifying agent are added, the stirring rate is maintained at 30-300 rounds/min, then 1-40 parts by weight of alkyl (meth)acrylate is added after the temperature of the reaction materials are increased to 70-90° C., the temperature is maintained at 80-85° C., after 2-5 hours of reaction, the temperature is cooled to below 40° C.

According to the preparation methods of the polyvinyl chloride mixtures of the present invention, preferably, the average particle size D50 of said high density polyethylene is 110-300 μm;

the average particle size is obtained by Taylor Sieve Method, the measurement is made specifically as follows: 200 g high density polyethylene is screened for 10 minutes by vibrating screening on different sieves, then the weight of the particles on the sieve is weighed, the particle size when particles that are 50% of the weight of the particles are screened is chosen to be the average particle size D50.

According to the preparation methods of the polyvinyl chloride mixtures of the present invention, preferably, the melt index of said high density polyethylene is 0.2-4.0 g/10 min; said melt Index is measured by ASTM D1238, the temperature is 190° C., the load is 5.0 kg.

The present invention fundamentally solves the defects of low elongation at break and poor toughness at low temperature of polyvinyl chloride products, which allow the elongations at break of polyvinyl chloride close to that of polyethylene, which will surely extending the range of use of polyvinyl chloride, and increasing the competitiveness of polyvinyl chlorides in the fields relative to the other plastic products.

DETAILED DESCRIPTION OF THE INVENTION

In the present invention, (meth)acrylates represent acrylates and/or methacrylates. (Meth)acrylic acid represent acrylic acid and/or methyl acrylic acid. In the present invention, unless otherwise defined, "parts" and "%" are all based on weight.

Impact strength and toughness are two different concepts, but in the prior art, it has been taught for a long time that toughness can be improved by increasing impact strength. The essence of impact strength is the ability to transform impact energy into heat energy when the material is impacted; whereas the essence of toughness is elongation at break and tensile strength. The larger the tensile strength is and the higher the elongation at break, the better the toughness of the material is. Therefore, toughness can be understood as the ability of quickly generating deformation and relieving stress when material is under stress or there's stress inside. In the present invention, it is discovered that impact strength is closely related to phase structure of material, toughness is closely related to elongation at break of material, thus elongation at break must be increased in order to increase toughness of material.

Compared with traditional polyvinyl chloride mixtures, the present invention can largely increase elongations at break of polyvinyl chloride products by adding high molecular polymers that are well compatible with polyvinyl chloride resins into polyvinyl chloride resins.

<Polyvinyl Chloride Mixtures>

The polyvinyl chloride mixtures of the present invention comprise polyvinyl chloride resins and toughening modifiers. Optionally, the present invention can also comprise one or more other additives including the following components: stabilizers, fillers, wood powder, polymers that comprise acrylates, anti-impact modifiers, lubricants, pigments. Preferably, the polyvinyl chloride mixtures of the present invention comprise polyvinyl chloride resins, toughening modifiers and stabilizers. More preferably, the polyvinyl chloride mixtures of the present invention comprise polyvinyl chloride resins, toughening modifiers, stabilizers and anti-impact modifiers. More preferably, the polyvinyl chloride mixtures of the present invention comprise polyvinyl chloride resins, toughening modifiers, stabilizers, anti-impact modifiers and lubricants.

Preferably, elongations at break of the polyvinyl chloride mixtures of the present invention can reach to above 200%, and above 230%, even above 260%. Said elongations at break are measured according to GB/T 1040.1-2006. The experiment conditions are carried out according to the regulations of GB/T1040.2-2006, the samples are 18 type dumb-bell shape samples. The stretching velocity of the experiment machine is 5 mm/min. The experiment temperature follows the regulation of GB/T2918-1998, the temperature is 24° C.-25° C.; the relative humidity is 50±5%.

The characteristics of the present invention lie in using rubber powders that have the elongation at break of 1601%-2201% and are well compatible with polyvinyl chloride resins as the toughening modifiers for polyvinyl chloride resins, said rubber powders can be any component as long as it can be well compatible with polyvinyl chloride resins and can be homogeneously dispersed into polyvinyl chloride resins under general processing conditions. For example, it can be chlorinated polyethylene, graft copolymer of chlorinated polyethylene and (meth)acrylates, interpenetrating copolymer networks of chlorinated polyethylene and (meth) acrylate or mixtures of chlorinated polyethylene and (meth) acrylate copolymers etc. The elongation at break of polyvinyl chlorides will be improved largely without significantly influencing the other physical and chemical properties of polyvinyl chlorides as long as the elongations at break of the above modifiers are higher than 1601%.

The polyvinyl chloride toughening modifier of the present invention is a component that is added to increase the elongation at break of polyvinyl chloride resin, and is a kind of rubber powders that are well compatible with polyvinyl chloride resins, the major components of the polyvinyl chloride toughening modifier can be chlorinated polyethylene, copolymer of chlorinated polyethylene and alkyl (meth) acrylate, or mixtures of chlorinated polyethylene and alkyl (meth)acrylate polymers. The importance is that the elongations at break of these rubber powders are relatively high, which is 1601%-2200%.

There's no special limitations for the methods for the preparation of the polyvinyl chloride resin mixtures of the present invention, for example, said methods can be carried out as long as polyvinyl chloride resins, toughening modifiers and other additives that can be added optionally are homogeneously mixed. Preferably, the preparation method of the mixture can be mixing polyvinyl chlorinated resins, toughening modifiers and other additives that can be optionally added with high-speed stirrer under suitable temperature then cooling the mixture with low-speed stirrer to obtain polyvinyl chloride mixtures.

There's no specially limitations for the method for forming the polyvinyl chloride resin mixture of the present invention, said mixture can be formed by general methods such as extrusion molding or injection molding.

<Polyvinyl Chloride Resin>

There's no special limitation for polyvinyl chloride resin of the present invention, any common polyvinyl chloride resins can be used in the present invention. The polyvinyl chloride resin of the present invention can be polyvinyl chloride homopolymers or polyvinyl chloride copolymers. Wherein preferred polyvinyl chloride copolymer may comprises 80-99.99 wt % chlorinated ethylene unit and 0.01-20 wt % units that are formed by other units. The preferred polyvinyl chloride copolymer can be obtained by the copolymerization of 80-99.99 wt % chlorinated ethylene units with 0.01-20 wt % other units that can be copolymerized with chloroethylene. Here the above preparation methods won't be further described as they are those that are known in the art. The other units that can be copolymerized with chloroethylene can be vinyl acetate, propylene, styrene, alkyl (meth)acrylate (for example, $C_1$-$C_{12}$ alkyl methacrylates) or other vinyl monomer. These monomers can be used separately or in combination, wherein the alkyl of the alkyl ester thereof is preferably $C_1$-$C_{12}$ alkyls, $C_1$-$C_5$ alkyls and $C_{1-3}$ alkyls. The examples of alkyls include but are not limited to methyl, ethyl, propyl, butyl, pentyl, hexyl, heptyl, octyl, nonyl, decyl, hendecyl, dodecyl.

There's not special limitation for the average degree of polymerization of the polyvinyl chloride of the present invention. For example, polyvinyl chloride resin with the degree of polymerization between 600-1300, preferably between 700-1100, most preferably between 800-1000 can be used. If the degree of polymerization is lower than 600, the mechanical property of the polyvinyl chloride products will be largely decreased; if the degree of polymerization is higher than 1300, general methods cannot be used for processing.

Preferably, the polyvinyl chloride resins of the present invention are homopolymers or copolymers that comprise no less than 80 wt % chloroethylene monomer units and no more than 20 wt % vinyl acetate, propylene, styrene or acrylate monomer units. If the weight percentage of chloroethylene monomer units is lower than 80 wt %, the mechanical property of the polyvinyl chloride resin will be decreased. Preferably, the content of chloroethylene monomer units is above 80 wt %, preferably above 90 wt %, most preferably above 95 wt %, based on the total monomer units of polyvinyl chloride resin. Preferably, the degree of polymerization of the above polyvinyl chloride resin is between 600-1300.

<Toughening Modifiers>

The polyvinyl chloride mixture of the present invention comprises, based on (a) 100 parts by weight of polyvinyl chloride resin, (b) 2-20 parts by weight of toughening modifier. When the amount of the toughening modifier is lower than 2 parts by weight, the elongation of polyvinyl chloride mixture will largely decrease; when the amount of the toughening modifier is higher than 20 parts, the processability of the polyvinyl chloride mixture will largely decrease. Based on (a) 100 parts by weight of polyvinyl chloride resin, the amount of use of toughening modifier is preferably 5-15 parts by weight, most preferably 8-13 parts by weight.

The toughening modifier used in the present invention is rubber powders. The elongation at break for the toughening modifier of the present invention is 1601%-2200%, preferably 1800%-2195%, more preferably 2000%-2190%. In this case, advantageously, the elongation at break of polyvinyl chloride mixture and thus the toughness at low temperature thereof will be improved. Here the elongation at break is measured by GB/T528-2009.

The weight percentage of chlorine of the toughening modifier used in the present invention is 5-45 wt %. The chlorine weight percentage represents the percentage of the weight of chlorine elements in the total weight of toughening modifier. The chlorine weight percentage of the present invention is measured by the method A of GB/T7139-2002 (the measurement of the chlorine content of plastic chloroethylene homopolymers and copolymers). When the content of chlorine is lower than 5 wt %, the toughening modifier is not compatible with polyvinyl chloride resin and cannot be dispersed homogeneously with polyvinyl chloride resin to form net structure. In such circumstance, the property of the polyvinyl chloride mixture will largely decrease. If the chlorine content is beyond 45 wt %, then the elongation at break of the toughening modifier will be largely decreased, and the hardness will be greatly increased, and the mechanical property of the polyvinyl chloride mixture will be largely decreased. The chlorine weight percentage of the toughening modifier of the present invention is preferably 10-40 wt %, most preferably 25-35 wt %.

There's no special limitations for the types of the toughening modifiers of the present invention, any polymers with an elongation at break between 1601%-2200% and 5-45% chlorine weight percentage can be used. Preferably, toughening modifiers used in the present invention can be selected from those polymers that can be mixed with polyvinyl chloride resins and dispersed homogeneously. More preferably, toughening modifiers used in the present invention can be selected from the group consisting of the following substances: chlorinated polyethylenes, copolymers of chlorinated polyethylene and (meth)acrylate or the mixtures of chlorinated polyethylene and (meth)acrylate polymer. More preferably, the toughening modifiers used in the present invention are selected from chlorinated polyethylene, graft copolymers of chlorinated polyethylene and (meth)acrylate, interpenetrating polymer networks of chlorinated polyethylene and (meth)acrylates, or mixtures of chlorinated polyethylene and (meth)acrylate copolymers. These polymers can be dispersed completely and homogeneously with polyvinyl chloride resin under general processing conditions. The toughening modifiers of the present invention are not limited to the above polymers, the polymers that can be mixed with polyvinyl chloride resins and dispersed homogeneously under general processing conditions and with an elongation at break between 1601%-2200% can also be used.

In the toughening modifier of the present invention, based on the total weight of the toughening modifier, the weight percentage of alkyl (meth)acrylate is 0-50 wt %. When the weight percentage of alkyl (meth)acrylate is greater than 50%, the powder flowability of the material will decrease, the toughening modifier cannot be homogeneously mixed with polyvinyl chloride resin. Therefore, the content of alkyl (meth)acrylate is 0-50 wt %, preferably 5-30%, most preferably 5-15 wt %. Wherein the alkyls in the alkyl esters comprise but are not limited to $C_1$-$C_{12}$ alkyls. The examples of alkyls can be but are not limited to methyl, ethyl, propyl, butyl, pentyl, hexyl, heptyl, octyl, nonyl, decyl, hendecyl, dodecyl.

As toughening modifiers added into the polyvinyl chloride resin mixtures, the average particle sizes (D50) of the toughening modifiers are preferably 160-650 μm, more preferably 200-600 μm, even more preferably 230-5501 μm. The smaller the particle sizes of the toughening modifiers are, the better the dispersities of the toughening modifiers in the polyvinyl chloride resins are, the better the net structures formed are, the longer the elongations of the polyvinyl chloride resin mixtures are, the better the toughnesses of the polyvinyl chloride products are. However, if the particle sizes are too small, the powders will easily agglomerate, resulting in that the formed products cannot be used; if the powders are too large, then the toughening agent cannot be dispersed completely into polyvinyl chloride resins. The particle size of the toughening modifier is measured by Taylor Sieve Method. The measurement method can be specified as follows: 200 g sample is screened for 10 minutes by vibrating screening on different sieves, then the weight of the particles on the sieve is weighed, the particle size when particles that are 50% of the weight of the particles are screened is chosen to be the average particle size D50.

<Other Additives>

The polyvinyl chloride mixtures of the present invention can comprise, based on (a) 100 parts by weight of polyvinyl chloride resin, (c) 0.5-5 parts by weight, preferably 1-4 parts by weight, more preferably 2-3 parts by weight of stabilizer. There's not special requirement for the stabilizers used in the present invention. Preferably, the stabilizer used in the present invention can be organotin heat stabilizer, calcium-zinc stabilizer or lead salt stabilizer etc. The calcium-zinc stabilizer comprises components such as calcium salt, zinc salt, lubricant, antioxidant as the major components and said stabilize is synthesized by a complex technique which won't be described here.

The polyvinyl chloride mixtures of the present invention can comprise, based on (a) 100 parts by weight of polyvinyl chloride resin, (d) 0-50 parts by weight, preferably 1-40 parts by weight, more preferably 5-30 parts by weight of filler. There's not special requirement for the types of the fillers used in the present invention, the filler is preferably inert, i.e. the filler doesn't react with the component in the polyvinyl chloride mixture. Preferably, the filler can be calcium carbonate, talc powder, carbon black or white carbon black etc.

The polyvinyl chloride mixtures of the present invention can comprise, based on (a) 100 parts by weight of polyvinyl chloride resin, (e) 0-50 parts by weight, preferably 1-40 parts by weight, more preferably 5-30 parts by weight of wood powders. Any wood powders can be used in the present invention.

The polyvinyl chloride mixtures of the present invention can comprise, based on (a) 100 parts by weight of polyvinyl chloride resin, (f) 0-10 parts by weight, preferably 0.2-5.0 parts by weight, more preferably 0.5-2.0 parts by weight polymers that comprise acrylates. Generally, polymers that comprise acrylates can improve the processability of polyvinyl chloride mixtures, the more the amount of use is, the better the processability is, but the cost is also increased. Therefore, under the circumstance that the processability of the polyvinyl chloride mixtures can be ensured, the amount of use is the less the better. The polymer that comprises acrylates of the present invention represents polymers comprising (meth)acrylate monomer units. The polymers that comprises acrylates of the present invention is preferably the copolymers that comprise alkyl methacrylates and alkyl acrylates, wherein the alkyls in the alkyl ester are preferably $C_1$-$C_{12}$ alkyls, $C_1$-$C_5$ alkyls, $C_3$-$C_3$ alkyls. The examples of the alkyls comprise but are not limited to: methyl, ethyl, propyl, butyl, pentyl, hexyl, heptyl, octyl, nonyl, decyl, hendecyl, dodecyl.

The polyvinyl chloride mixtures of the present invention can comprise, based on (a) 100 parts by weight of polyvinyl chloride resin, (g) 0-10 parts by weight, preferably 1-8 parts by weight, more preferably 2-4 parts by weight of anti-impact modifier. When the amount of use of anti-impact modifier is larger than 10 parts, the tensile strength, the hardness, the Vicat softening point will decrease greatly. There's no special limitation for the types of the anti-impact modifiers of the present invention, the materials that can increase the notch impact strength of polyvinyl chloride resin can be used. Preferably, the anti-impact modifier of the present invention can be acrylate anti-impact modifier, terpolymers of methacylate-styrene-butadiene (MBS) etc.

The polyvinyl chloride mixtures of the present invention can comprise, based on (a) 100 parts by weight of polyvinyl chloride resin, (h) 0-5 parts by weight, preferably 0.1-3 parts by weight, more preferably 0.5-2 parts by weight of lubricants. Preferably, the lubricants of the present invention can be selected from one or more oxidized polyethylene wax, polyethylene wax, paraffin, stearic acid, monoglyceric stearate, pentaerythrite stearate, pentaerythrite adipate or calcium stearate.

The polyvinyl chloride mixtures of the present invention can comprise, based on (a) 100 parts by weight of polyvinyl chloride resin, (i) 0-10 parts by weight, preferably 1-8 parts by weight, more preferably 2-5 parts by weight of pigments. Preferably, the pigments of the present invention can be selected from one or more of titanium white, carbon black, ultramarine pigment or fluorescent whitener.

<Preparation of Toughening Modifiers>

There's no special limitation for the preparation method of the toughening modifiers used in the present invention, any rubber powders that have an elongation at break larger between 1601%-2200% and with a chlorine weight percentage of 5-45% can be used. The preparation method of toughening modifiers will be illustrated below.

(1) Polyvinyl Chloride can be Prepared According to the Following Method:

0.01-1.00 parts by weight of dispersing agent, 0.01-1.00 parts by weight of emulsifying agent are added to the reactor, then a dispersing medium is added, the total parts by weight of the three auxiliary raw material are 250 parts by weight; then 15-40 parts by weight of high density polyethylene, 0.01-0.5 parts by weight of initiating agent were added, after the temperature of the reaction materials are increased to 70-105° C. under stirring, according to the volume of the reactor and the stirring strength of the stirring rake, in order to ensure the reaction liquid is mixed homogeneously, the stirring rate is maintained at 30-300 rounds/min, 4-50 parts by weight of chlorine gas are inlet, the temperature was increased to 135-142° C. while inletting chlorine gas, the rate of inletting chlorine gas must satisfy that below 60% of the total amount of the chlorine is inlet below 135° C., and above 40% of the total amount of the chlorine is inlet above 135° C. Rubber powders with elongations at break between 1601-2200% can be obtained after centrifugation and drying.

The chlorinated polyethylene rubber powder obtained in step (1) can be directly used to toughen and modify polyvinyl chloride at low temperature. Besides, copolymers of chlorinated polyethylene and (meth)acrylate can be obtained by grafting or interpenetrating network copolymerization between the chlorinated polyethylene rubber powder obtained in the above step (1) and alkyl (meth)acrylate, to form rubber powder with an elongation at break between 1601%-2200%.

(2) Copolymers of Chlorinated Polyethylene and (Meth) Acrylate are Prepared According to the Following Method:

0.01-1.00 parts by weight of dispersing agent, 0.01-0.50 parts by weight of initiating agent and a dispersing medium are added to the reactor, the total parts by weight of the three auxiliary raw materials are 250 parts by weight; then 15-40 parts by weight of the above chlorinated polyethylene, 0.01-0.50 parts by weight of emulsifying agent are added, the stirring rate is maintained at 30-300 rounds/min, then 1-40 parts by weight of alkyl (meth)acrylate is added after the temperature of the reaction materials is increased to 70-90° C., the reaction temperature is maintained at 80-85° C., after 2-5 hours of reaction, the temperature is cooled to below 40° C. The polymer rubber particles with an elongation at break between 1601%-2200% is obtained after centrifugation and drying.

While producing the toughening modifiers of the present invention, the average particle size Dn (preferably D50) of the above high density polyethylene can be between 110-300 μm. When the particle size of the high density polyethylene is smaller than 110 μm, the viscosity of the reaction solution during the process of chlorination is too large, and it is difficult to stir the reaction, and the reaction solution is poorly mixed, and the reaction can hardly be carried out. If the average particle size of the high density polyethylene is larger than 300 μm, even the viscosity of the reaction solution is not high, as chlorine gas is hard to enter HDPE, the rate of reaction of chlorination is slowed, and the homogeneity of chlorination is decreased, resulting in the decrease of the property of toughening modifier. The average particle size D50 of the HDPE used in the production of the toughening modifier of the present invention is between 100-300 μm, preferably between 120-200 μm, most preferably between 130-150 μm.

The above particle sizes are obtained by Taylor Sieve Method, the measurement method can be specified as follows: 200 g high density polyethylene is screened for 10 minutes by vibrating screening on different sieves, then the weight of the particles on the sieve is weighed, the particle size when the particles that are 50% of the weight of the particles are screened is chosen to be the average particle size D50.

When producing the toughening modifier of the present invention, the melt index of the above high density polyethylene (HDPE) is 0.2-4.0 g/10 min. When the melt index is lower than 0.2 g/10 min, the compatibility between the toughening modifier and the polyvinyl chloride resin will be decreased and the toughening modifier cannot be dispersed into polyvinyl chloride resin, thus the mechanical property of the material will be decreased; when the melt index is higher than 4.0 g/10 min, then the mechanical property of the polyvinyl chloride mixture, such as the tensile strength will be largely decreased. Therefore, the melt index of HDPE is 0.2-4.0 g/10 min, preferably 0.3-3.0 g/10 min, more preferably 0.4-1.0 g/10 min. The above melt index is measured with ASTM D1238.

In the preparation processes of the toughening modifiers of the present invention, the dispersing medium that is generally used is water.

In the preparation processes of the toughening modifiers of the present invention, the type of dispersing agents is not specially limited. For example, the dispersing agent can comprise water-soluble copolymers of alkyl (meth)acrylate and (meth)acrylate, wherein the alkyls in the alkyl esters are preferably $C_1$-$C_{12}$ alkyls, $C_1$-$C_5$ alkyls and $C_1$-$C_3$ alkyls. The examples of alkyls can be but are not limited to methyl, ethyl, propyl, butyl, pentyl, hexyl, heptyl, octyl, nonyl, decyl, hendecyl, dodecyl.

In the preparation processes of the toughening modifiers of the present invention, the type of emulsifying agent is not specially limited. For example, the emulsifying agent can comprise polyoxyethylene alkyl ether, polyoxyethylene aliphatate or lauryl sodium sulfate.

In the preparation processes of the toughening modifier of the present invention, the initiating agent can be water-soluble polymerization initiating agent and oil-soluble polymerization initiating agent. For example, the initiating agent can be inorganic Initiating agent (such as peroxysulphate), organic peroxides or azo compound. These initiating agents can be used separately or in combination with an oxidation-reduction system that is composed of sulfites, thiosulfate, formaldehyde sodium sulphoxylate. In the initiating agents of the present invention, the persulfates can be selected from sodium persulfate, potassium persulfate, ammonium persulfate etc. The organic peroxides can be selected from tert-butyl hydroperoxide, benzoyl peroxide etc.

The toughening modifiers with the required elongation at break will be obtained by adjusting suitable reaction temperature, rate of chlorine inlet and amount of the chlorine inlet according to use purposes.

In summary, the toughening modifiers of the present invention can be obtained by a one-step, two-step or multi-step reaction. If a two-step reaction or a multi-step reaction is applied, it should be confirmed that a previous step must be completed before adding the reactants of the next step. Accordingly, the reactants of each step will not mix with the reactants of the following step.

The obtained polymer rubber particles are centrifuged, washed with water and dried by common methods according to the requirement after the reaction is completed.

The present invention will be illustrated in detail by the examples and the comparative examples below, unless otherwise defined, all the "parts" and "%" are based on weight. It should be understood that the present invention shall not be limited to those examples.

<Testing Method>
(1) Test of Elongations at Break of Toughening Modifiers.

The test is carried out according to GB/T 528-2009 (test of strain performances of tensile stress of vulcanized rubber or thermoplastic rubber). The sample is prepared according to the regulations of the section 5.9 of HG/T2704-2010: pelleting temperature 85±+2° C., mixing time 3 min, compression molding temperature 130° C., temperature is kept constant for 5 min, and pressure is maintained for 2 min. A type 1 dumb-bell shape sample is used, stretching velocity of the tensile machine is 500 mm/min. According to the regulations of GB/T2941-2006, the temperature of the test is 24-25° C.; and the relative humidity is 50±5%.

The tensile machine is the modified universal test machine of the type UTM-1422 (Jin Jian Testing matching Ltd., Chengde), the specific parameters are as follows:

| | Type | UTM-1422 |
|---|---|---|
| Testing parameters | Maximum testing force | 10 kN |
| | Degree of testing machine | 0.5 degree |
| | Measuring range of testing forces | 0.2%-100% FS |
| | Relative error of the indicating value of testing forces | ±0.5% |
| | Resolution capacity of testing forces | 1/200000 |
| | Measuring range of deformation | 0.2-100% FS |
| | Relative error of the indicating value of deformations | Within ±0.50% |
| | Resolution capacity of deformations | 1/200000 |
| | Measuring range of gross distortions | 5-800 mm |
| | Relative error of the indicating value of gross distortions | Within ±0.50% |
| | Resolution capacity of gross distortions | 0.0125 mm |
| | Test of bending depletion extensometer | 15 mm |
| | Resolution capacity of bending depleting extensometer | 0.001 mm |
| | Accuracy of bending depleting extensometer | 0.005 mm |
| | Relative error of the indicating value of beam displacements | Within ±0.50% |
| | Resolution capacity of displacements | 0.001 mm |
| Control parameters | Adjusting range of force control rates | 0.005-5% FS/S |
| | Relative error of force control rates | Within ±1% of the set point |
| | Adjusting range of deformation rates | 0.02-5% FS/S |
| | Relative error of deformation control rates | Within ±2% of the set point when the rate is less than 0.05% FS; within ±0.5% of the set point when the rate is larger than or equal to 0.05% |

| Type | UTM-1422 |
|---|---|
| Adjusting range of beam rates | 0.001-500 mm/min |
| Beam rates; relative error | Within ±1.0% of the set point when the rate is less than 0.05 mm/min; within ±0.5% of the set point when the rate is larger than or equal to 0.05 m/min; |
| Control range of constant forces, constant deformations | 0.5%-100% FS |
| Control accuracy of constant forces, constant deformations, constant displacements | Within ±0.1% of the set point when the set point is greater than or equal to 10% FS; within ±1% of the set point when the set point is less than 10% FS; |
| Effective testing width | 400 mm |
| Maximum stretch stroke | 1400 mm |

(2) Test of Elongations at Break of Polyvinyl Chloride Mixtures.

The test is carried out according to GB/T 1040.1-2006 (Test of the tensile performance of plastics, Part 1: General rules). The experiment conditions are carried out according to the regulations of GB/T1040.2-2006 (Test of the tensile performance of plastics, Part 2: Experiment condition of molded plastics and extruded plastics). The sample is a 18 type dumb-bell shape sample. The stretching velocity of the tensile machine is 5 mm/min. According to the regulations of GB/T2918-1998, the temperature of the test is 24-25° C.; and the relative humidity is 50±5%.

(3) Test of Reaction Conversions

Conversion of the reaction is calculated according to the following equation:

Reaction conversion=(Weight of the generated rubber plastics/the amount of the reactant fed)×100%; with the amount of chlorine gas calculated based on half of the actual feeding amount when chlorine gas is one of the reactant.

(4) Test of Powder Sizes

The test is carried out according to Taylor Sieve Method. The specific test method is as follows: 200 g sample is screened for 10 minutes by vibrating screening on different sieves, then the weight of the particles on the sieve is weighed, the particle size when the particles that are 50% of the weight of the particles are screened is chosen to be the average particle size D50.

(5) Test of the Melt Index of High Density Polyvinyl Chloride (HDPE)

The test is carried out using ASTM 01238, the temperature is 190° C., the load is 5.0 kg, the unit of melt index is g/10 min.

<Molding Conditions and Standards of Extruding Machine>

The temperature of the sections of extruding machine that used for extruding polyvinyl chloride sheets: C1=165° C., C2=175° C., C3=185° C. The temperature of die head=185° C.

The standards of extruding machine are as follows:

Screw: length-to-diameter ratio (L/D)=25, compression ratio=2.5, rotating rate of main engine=60 rounds/min.

Die head: width=100 mm, thickness=3 mm.

Example 1

(1) Preparation of Toughening Modifiers 0.25 part of water-soluble methyl methacrylate/acrylic acid copolymer was added as a dispersing agent to a 30 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 30 parts of high density polyethylene, 0.2 parts of benzoyl peroxide were added. After the temperature of the reaction materials were increased to 80° C. under the stirring rate of 90 rounds/min, 36 parts by weight of chlorine gas was inlet, then the temperature was increased to 135° C. while inletting chlorine gas. The amount of the chlorine gas inlet during the temperature increasing was 20 parts, and the temperature increasing and the chlorine gas inlet were carried out simultaneously. The temperature was kept at 135° C. after reaching 135° C., the rest 16 parts of chlorine gas was inlet. The rubber powder with an elongation at break of 1640% was obtained after centrifugation and drying (sample 1).

The conversion of the reaction was 99.7%, the content of chlorine (i.e. the weight percentage of chlorine, the contents of chlorine below are represented in the same way) was 37.4%, the average particle size 050 of the powder was 240 μm.

(2) Preparation of Polyvinyl Chloride Mixtures and Polyvinyl Chloride Sheet Products 100 parts of polyvinyl chloride (S-1000, the average degree of polymerization is 1000, produced by QILU subsidiary of SINOPEC), 10 parts of the above rubber powder (sample 1), 2 parts of methyl methacrylate-styrene-butadiene copolymer MBS (RK-56P), 5 parts of calcium carbonate, 5 parts of titanium dioxide, 2 parts of methyltin heat stabilizer (the content of tin is 18%), 1 part of calcium stearate, 0.5 part of paraffin (the melt point is 60° C.), 0.5 part of polyethylene wax (the melt point is 110° C.) were added to a high-speed mixer, then stirring was started, the temperature inside was increased to 120° C. Polyvinyl chloride mixture powders were obtained after cooling.

The mixture was extruded by the extruding machine according to the above conditions to obtain polyethylene mixture sheet products. The elongation at break was measured, the results of the experiment can be seen in table 1.

Example 2

(1) Preparation of Toughening Modifiers

Water, 0.1 part of polymethyl methacrylate/acrylic acid copolymer dispersing agent, 0.05 part of benzoyl peroxide were added to a 24 L reactor equipped with a stirring rake, the total amount of water used and the amount of all the auxiliary raw materials were 250 parts. 30 parts of sample 1, 0.2 part of dodecyl sodium sulfate were added then. Under the stirring rate of 60 rounds/min, the temperature of the reaction material was increased to 80° C., then 3 parts of butyl acrylate and 1 part of methyl methacrylate were added, the temperature was kept at 80-85° C., after 3 hours of reaction, the temperature was cooled to below 40° C. The rubber powder with an elongation at break of 1660% was obtained after centrifugation and drying (sample 2).

The conversion of the reaction was 99.3%, the average particle size D50 of the powder was 310 µm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Example 3

(1) Preparation of Toughening Modifiers 0.25 part of water-soluble methyl methacrylate/acrylic acid copolymer was added as a dispersing agent to a 24 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 30 parts of high density polyethylene, 0.2 parts of benzoyl peroxide were added. After the temperature of the reaction material was increased to 80° C. under stirring (120 rounds/min stirring rate), 36 parts of chlorine gas was inlet, the temperature was increased to 136° C. while inletting chlorine gas, the increase of temperature and the inlet of chlorine gas were carried out simultaneously. After the temperature reached 136° C., the rest 16 parts of chlorine gas was inlet. The rubber powder with an elongation at break of 1720% was obtained after centrifugation and drying (sample 3).

The conversion of the reaction was 99.5%, the content of chlorine was 37.3%. The average particle size D50 of the powder was 250 µm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Example 4

(1) Preparation of Toughening Modifiers 0.25 part of water-soluble methyl methacrylate/acrylic acid copolymer was added as a dispersing agent to a 30 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 30 parts of high density polyethylene, 0.1 part of tert-butyl hydroperoxide were added. After the temperature of the reaction material was increased to 90° C. under stirring (120 rounds/min stirring rate), 20 parts of chlorine gas was inlet, then the temperature was increased to 136° C. while inletting chlorine gas, and the temperature increasing and the chlorine gas inlet were carried out simultaneously. After the temperature reached 136° C., the rest 16 parts of chlorine gas was inlet. The rubber powder with an elongation at break of 1870% was obtained after centrifugation and drying (sample 4).

The conversion of the reaction was 99.1%, the content of chlorine was 37.2%. The average particle size D50 of the powder was 2601 µm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Example 5

(1) Preparation of Toughening Modifier 0.25 part of water-soluble methyl methacrylate/acrylic acid copolymer was added as a dispersing agent to a 30 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 30 parts of high density polyethylene, 0.1 part of benzoyl peroxide were added. After the temperature of the reaction material was increased to 95° C. under stirring (120 rounds/min stirring rate), 20 parts of chlorine gas was inlet, then the temperature was increased to 137° C. while inletting chlorine gas, and the temperature increasing and the chlorine gas inlet were carried out simultaneously. After the temperature reached 137° C., the rest 16 parts of chlorine gas was inlet. The rubber powder with an elongation at break of 1950% was obtained after centrifugation and drying (sample 5).

The conversion of the reaction was 98.9%, the content of chlorine was 37.0%. The average particle size D50 of the powder was 2801 m.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Example 6

(1) Preparation of Toughening Modifiers 0.25 part of water-soluble methyl methacrylate/acrylic acid copolymer was added as a dispersing agent to a 30 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 25 parts of sample 5, 0.08 part of potassium persulfate were added. After the temperature of the reaction material was increased to 80° C. under stirring of 60 rounds/min, 8 parts of octyl acrylate and 2 parts of butyl methacrylate were added, then the temperature was kept at 80-85° C., after 4 hours of reaction, the temperature was cooled to below 40° C. The rubber powder with an elongation at break of 2140% was obtained after centrifugation and drying (sample 6).

The conversion of the reaction was 99.0%, the average particle size D50 of the powder was 430 μm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Example 7

(1) Preparation of Toughening Modifiers 0.25 part of water-soluble methyl methacrylate/acrylic acid copolymer was added as a dispersing agent to a 30 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 30 parts of high density polyethylene, 0.15 part of tert-butyl hydroperoxide were added. After the temperature of the reaction material was increased to 95° C. under stirring (120 rounds/min stirring rate), 19 parts of chlorine gas was inlet, then the temperature was increased to 137° C. while inletting chlorine gas. The temperature increasing and the chlorine gas inlet were carried out simultaneously. After the temperature reached 137° C., the rest 17 parts of chlorine gas was inlet. The rubber powder with an elongation at break of 2080% was obtained after centrifugation and drying (sample 7).

The conversion of the reaction was 98.7%, the content of chlorine was 37.0%. The average particle size D50 of the powder was 300 μm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Example 8

(1) Preparation of Toughening Modifiers 0.35 part of water-soluble methyl methacrylate/acrylic acid copolymer was added as a dispersing agent to a 30 L reactor that is equipped with a stirring rake, 0.44 parts of polyoxyethylene lauryl ether was added as an emulsifying agent, then water was added, the total amount of water used and the amount of all the auxiliary raw materials were 250 parts. Then 30 parts of high density polyethylene, 0.2 part of benzoyl peroxide were added. After the temperature of the reaction material was increased to 100° C. under stirring (120 rounds/min stirring rate), 19 parts of chlorine gas was inlet, then the temperature was increased to 137° C. while inletting chlorine gas. The temperature increasing and the chlorine gas inlet were carried out simultaneously. After the temperature reached 137° C., the rest 17 parts of chlorine gas was inlet. The rubber powder with an elongation at break of 2190% was obtained after centrifugation and drying (sample 8).

The conversion of the reaction was 98.5%, the content of chlorine was 36.9%. The average particle size D50 of the powder was 330 μm.

(2) Preparation of Polyvinyl Chloride Mixtures and Polyvinyl Chloride Sheet Products The preparation method of polyvinyl chloride mixture and polyvinyl chloride sheet products is the same as that of examples 1. The results of the experiment can be seen in table 1.

Example 9

(1) Preparation of Toughening Modifiers 0.25 part of water-soluble methyl methacrylate/acrylic acid copolymer was added as a dispersing agent to a 30 L reactor that is equipped with a stirring rake, 0.24 parts of polyoxyethylene lauryl ether was added as an emulsifying agent, then water was added, the total amount of water used and the amount of all the auxiliary raw materials were 250 parts. Then 25 parts of sample 7, 0.02 part of potassium persulfate were then added. After the temperature of the reaction material was increased to 80° C. under the stirring rate of 60 rounds/min, 2 parts of octyl acrylate and 1 part of butyl methacrylate were added then. The temperature was kept at 80-85° C. and was cooled to below 40° C. after 4 hours of reaction. The rubber powder with an elongation at break of 2185% was obtained after centrifugation and drying (sample 9).

The conversion of the reaction was 99.0%, the average particle size D50 of the powder was 530 μm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Comparative Example 1

(1) Preparation of Modifiers 0.25 part of water-soluble methyl methacrylate-acrylic acid copolymer was added as a dispersing agent to a 30 L reactor that is equipped with a stirring rake, 0.24 part of polyoxyethylene lauryl ether was added as an emulsifying agent, then water was added, the total amount of water used and the amount of all the auxiliary raw materials were 250 parts. Then 30 parts of high density polyethylene, 0.1 part of benzoyl peroxide were added. After the temperature of the reaction material was increased to 80° C. under stirring (120 rounds/min stirring rate), 25 parts of chlorine gas was inlet, the temperature increasing and the chlorine gas inlet were carried out simultaneously. After the temperature reached 130° C., the rest 11 parts of chlorine gas was inlet. The rubber powder with an elongation at break of 740% was obtained after centrifugation and drying (comparative sample 1).

The conversion of the reaction was 99.7%, the content of chlorine was 37.4%, the average particle size D50 of the powder was 200 μm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

Comparative Example 2

(1) Preparation of Modifiers 0.25 part of water-soluble methyl methacrylate-acrylic acid copolymer was added as a dispersing agent to a 30 L reactor that is equipped with a stirring rake, 0.24 part of polyoxyethylene lauryl ether was added as an emulsifying agent, then water was added, the total amount of water used and the amount of all the auxiliary raw materials were 250 parts. Then 30 parts of high density polyethylene, 0.2 part of tert-butyl hydroperoxide were added. After the temperature of the reaction material was increased to 75° C. under stirring (120 rounds/min stirring rate), 22 parts of chlorine gas was inlet, then the temperature was increased to 135° C. while inletting chlorine gas. The time for increasing the temperature was 1 hour, the temperature increasing and the chlorine gas inlet were carried out simultaneously. After the reaction temperature reached 135° C., the rest 14 parts of chlorine gas was inlet. The rubber powder with an elongation at break of 1040% was obtained after centrifugation and drying (comparative sample 2).

The conversion of the reaction was 99.7%, the content of chlorine was 37.4%, the average particle size D50 of the powder was 220 μm.

(2) Preparation of Polyvinyl Chloride Mixtures and Polyvinyl Chloride Sheet Products The preparation method of polyvinyl chloride mixtures and polyvinyl chloride sheet products is the same as that of examples 1. The results of the experiment can be seen in table 1.

TABLE 1

| Number | Elongation at break of polyvinyl chloride sheet products (%) | Elongation at break of rubber powders (%) |
| --- | --- | --- |
| Example 1 | 238 | 1640 |
| Example 2 | 242 | 1660 |
| Example 3 | 244 | 1720 |
| Example 4 | 248 | 1870 |
| Example 5 | 253 | 1950 |
| Example 6 | 262 | 2140 |
| Example 7 | 258 | 2080 |
| Example 8 | 271 | 2190 |
| Example 9 | 266 | 2185 |
| Comparative example 1 | 171 | 740 |
| Comparative example 2 | 186 | 1040 |

From table 1, it can be seen that the larger the elongations at break of the toughening modifier rubber powders are, the larger the elongations at break of the polyvinyl chloride sheet products are, the better the toughnesses of the polyvinyl chloride products at low temperature are.

Examples 10-13

Except the amount of use of the toughening modifier (sample 6) in the polyvinyl chloride mixture were changed, the rest of the steps and the conditions are the same of that of example 6. In examples 10, 11, 12 and 13, the amount of use of sample 6 were 7 parts, 9 parts, 11 parts and 13 parts respectively. The results of the experiments can be seen in table 2.

Comparative Examples 3-4

Except the amount of use of the toughening modifier (sample 6) in the polyvinyl chloride mixture were changed, the rest of the steps and the conditions are the same of that of example 6. In the comparative examples 3 and 4, the amounts of use of sample 6 were 1 part, 1.8 parts respectively. The results of the experiments can be seen in table 2.

Comparative Example 5

Except the amount of use of the toughening modifier (sample 6) in the polyvinyl chloride mixture were changed, the rest of the steps and the conditions are the same of that of example 6. In the comparative example 6, the amount of use of sample 6 was 26 parts. However, polyvinyl chloride mixture cannot be molded by extrusion of extruding machine because of the poor processability of the mixture. The experiment results can be seen in table 2.

TABLE 2

|  | Sample 6 (Parts by weight) | Elongations at break of polyvinyl chloride sheet products (%) |
| --- | --- | --- |
| Example 10 | 7 | 227 |
| Example 11 | 9 | 252 |
| Example 12 | 11 | 270 |
| Example 13 | 13 | 293 |
| Comparative example 3 | 1 | 111 |
| Comparative example 4 | 1.8 | 125 |
| Comparative example 5 | 26 | — |

It can be seen from table 2 that the higher the amount of use of the toughening modifiers, the larger the elongations at break of the polyvinyl chloride are. However, the elongations at break of the polyvinyl chloride mixtures are very low when the amount of use of the toughening modifier is less than 2 parts. When the amounts of use of the toughening modifiers are larger than 20 parts, the polyvinyl chloride mixtures can hardly be molded by processing.

The invention claimed is:
1. A polyvinyl chloride mixture, comprising the following components based on parts by weight:
(a) 100 parts polyvinyl chloride resin, and
(b) 2-20 parts toughening modifier;
wherein said toughening modifier comprises a rubber powder with 1601%-2200% elongation at break and 5-45 wt % of chlorine; wherein said toughening modifier is selected from the group consisting of: chlorinated polyethylenes, copolymers of chlorinated polyethylene and (meth)acrylate, and mixtures of chlorinated polyethylene and (meth)acrylate polymer;

said elongation at break is tested by GB/T528-2009;
the weight percentage of chlorine is tested by the method A of GB/T7139-2002.

2. The polyvinyl chloride mixture according to claim 1, further comprising the following components based on parts by weight:
(a) 0.5-5 parts stabilizer,
(b) 0-50 parts filler,
(c) 0-50 parts wood powder,
(d) 0-10 parts polymers that comprise acrylates,
(e) 0-10 parts anti-impact modifier,
(f) 0-5 parts lubricant, and
(g) 0-10 parts pigment.

3. The polyvinyl chloride mixture according to claim 1, wherein said polyvinyl chloride resin is a polyvinyl chloride homopolymer or a polyvinyl chloride copolymer; wherein, the polyvinyl chloride copolymer comprises 80-99.99 wt % vinyl chloride units and 0.01-20 wt % units that are formed by other units; said other units are selected from one or more of vinyl acetate, propylene, styrene, $C_1$-$C_{12}$ alkyl esters of methacrylic acid, $C_1$-$C_{12}$ alkyl esters of acrylic acid.

4. The polyvinyl chloride mixture according to claim 1, wherein in said toughening modifiers, based on the total weight of the toughening modifier, the weight percentage of alkyl (meth)acrylate is 0-50 wt %.

5. The polyvinyl chloride mixture according to claim wherein said stabilizer is selected from organotin heat stabilizers, calcium-zinc stabilizers, or lead salt stabilizers;
said filler is selected from calcium carbonate, talc powders or white carbon black;
said polymers that comprise acrylates are selected from copolymers comprising alkyl methacrylates and alkyl acrylates;
said anti-impact modifier is selected from copolymers formed from at least one of methyl methacrylate, styrene, and butadiene;
said lubricant is selected from oxidized polyethylene wax, polyethylene wax, paraffin, stearic acid, glycerol monostearate, pentaerythritol stearate, pentaerythritol adipate, and calcium stearate;
said pigment is selected from titanium white, carbon black, ultramarine pigment and fluorescent whitener.

6. A method of preparing the polyvinyl chloride mixture according to claim 1, wherein said preparation method comprises:
introducing 0.01-1.00 parts by weight of dispersing agent and 0.01-1.00 parts by weight of emulsifying agent to a reactor,
adding a dispersing medium,
wherein the total parts by weight of the dispersing agent, the emulsifying agent and the dispersing medium are 250 parts by weight;
adding 15-40 parts by weight of high density polyethylene and 0.01-0.5 parts by weight of initiating agent, the temperature of the reaction materials are increased to 70-105° C. under the stirring rate of 30-300 rounds/min, and the stirring is maintained between 30-300 rounds/min;
adding 4-50 parts by weight of chlorine gas, and the temperature is increased to 135-142° C. while inletting chlorine gas; the chlorine gas is added such that below 60% of the total amount of the chlorine gas is inlet below 135° C., and above 40% of the total amount of the chlorine gas is inlet above 135° C.

7. A method of preparing the polyvinyl chloride mixture according to claim 1, wherein said method comprises:
(1) preparation of chlorinated polyethylene:
introducing 0.01-1.00 parts by weight of dispersing agent and 0.01-1.00 parts by weight of emulsifying agent to a reactor,
adding a dispersing medium,
wherein the total parts by weight of the dispersing agent, the emulsifying agent and the dispersing medium are 250 parts by weight;
adding 15-40 parts by weight of high density polyethylene and 0.01-0.5 parts by weight of initiating agent; the temperature of the reaction materials are increased to 70-105° C. under the stirring rate of 30-300 rounds/min; and the stirring is maintained between 30-300 rounds/min;
adding 4-50 parts by weight of chlorine gas, and the temperature is increased to 135-142° C. while inletting chlorine gas; the chlorine gas is added such that below 60% of the total amount of the chlorine gas is inlet below 135° C., and above 40% of the total amount of the chlorine gas is inlet above 135° C.;
(2) preparation of chlorinated polyethylene and (meth) acrylate copolymers:
adding 0.01-1.00 parts by weight of dispersing agent, 0.01-0.50 parts by weight of initiating agent and a dispersing medium to the reactor,
wherein the total parts by weight of the dispersing agent, the initiating agent and the dispersing medium are 250 parts by weight;
adding 15-40 parts by weight of the chlorinated polyethylene obtained in step (1) and 0.01-0.50 parts of emulsifying agent, the stirring rate is maintained at 30-300 rounds/min,
adding 1-40 parts by weight of alkyl (meth)acrylate after the temperature of the reaction materials is increased to 70-90° C., the temperature is maintained at 80-85° C. for 2-5 hours, the temperature is cooled to below 40° C.

8. The method of preparing the polyvinyl chloride mixture according to claim 6, wherein the average particle size D50 of said high density polyethylene is 110-300 μm; the average particle size is obtained by the Taylor Sieve Method, the measurement is made specifically as follows: 200 g high density polyethylene is screened for 10 minutes by vibrating screening on different sieves, then the weight of the particles on the sieve is weighed, the particle size when particles that are 50% of the weight of the particles are screened is chosen to be the average particle size D50.

9. The method of preparing the polyvinyl chloride mixture according to claim 8, wherein the melt index of said high density polyethylene is 0.2-4.0 g/10 min; said melt index is measured by ASTM D1238, the temperature is 190° C., the load is 5.0 kg.

10. The polyvinyl chloride mixture according to claim 2, wherein said polyvinyl chloride resin is a polyvinyl chloride homopolymer or a polyvinyl chloride copolymer;
wherein the polyvinyl chloride copolymer comprises 80-99.99 wt % vinyl chloride units and 0.0120 wt % units that are formed by other units;
said other units are selected from one or more of vinyl acetate, propylene, styrene, $C_1$-$C_{12}$ alkyl esters of methacrylic acid, $C_1$-$C_{12}$ alkyl esters of acrylic acid.

11. The polyvinyl chloride mixture according to claim 2, wherein in said toughening modifiers, based on the total weight of the toughening modifier, the weight percentage of alkyl (meth)acrylate is 0-50 wt %.

12. The method of preparing the polyvinyl chloride mixture according to claim 7, wherein the average particle size D50 of said high density polyethylene is 110-300 μm; the average particle size is obtained by the Taylor Sieve Method, the measurement is made specifically as follows: 200 g high density polyethylene is screened for 10 minutes by vibrating screening on different sieves, then the weight of the particles on the sieve is weighed, the particle size when particles that are 50% of the weight of the particles are screened is chosen to be the average particle size D50.

* * * * *